Patented Oct. 10, 1939

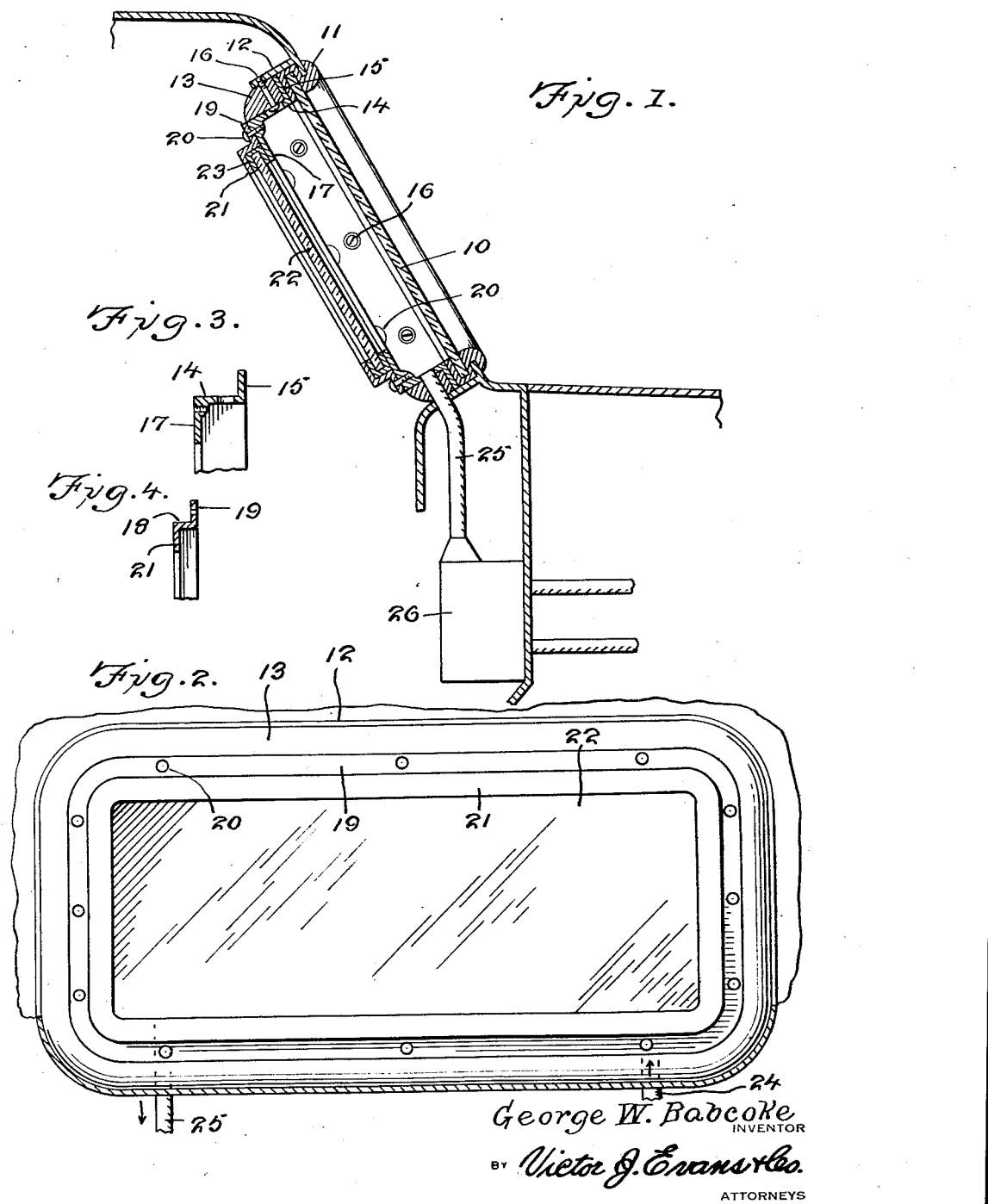

2,175,625

UNITED STATES PATENT OFFICE 2,175,625

WINDSHIELD

George W. Babcoke, Flint, Mich.

Application November 29, 1937, Serial No. 177,128

1 Claim. (Cl. 296—84)

This invention relates to windshields and has for an object to provide a novel frame and glass pane therein adapted to coact with the automobile windshield of a vehicle in forming a heating compartment through which hot air may be circulated to prevent frosting of the vehicle windshield.

A further object is to provide a novel pane carrying frame which may be secured in place by the molding and parts of the car by means of which the conventional windshield is mounted in place.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a vertical sectional view of a windshield constructed in accordance with the invention in applied position.

Figure 2 is a rear elevation of the windshield shown in Figure 1.

Figure 3 is a detail cross sectional view of the mounting frame of the device.

Figure 4 is a detail cross sectional view of the pane clamping frame of the device.

Referring now to the drawing in which like characters of reference designate similar parts in the various views, 10 designates the windshield, 11 the gasket, 12 the windshield frame, and 13 the molding which secures the windshield in the frame, these parts all being conventional windshield construction.

The molding 13 is utilized for mounting the present invention and for this purpose the device includes a mounting frame 14 having an outer flange 15 adapted to be held against the gasket 11 by the molding 13. Screw bolts 16 are passed through the mounting frame 14, through the molding 13, into threaded openings in the windshield frame 12.

The mounting frame 14 is provided with an inner flange 17 to which a clamp frame 18 is secured. The clamp frame is provided with a flange 19, best shown in Figure 4, adapted to abut the inner flange 17 of the mounting frame and to be secured thereto by screw bolts 20. The clamp frame is also provided with an inner flange 21 which is adapted to secure a windshield pane 22 in rear of and in parallel with the windshield pane 10. A gasket 23 is disposed between the clamp frame and the mounting frame flange 17 to prevent rattling of the pane 22.

The heating chamber between the panes 10 and 22 may be supplied with hot air from any suitable source, there being an inlet pipe 24 and an outlet pipe 25 entering the chamber through the bottom of the mounting frame and bottom of the molding. The air may be circulated by a conventional blower 26.

The heated air circulating through the air chamber will prevent frosting of the windshield 10 while at the same time clear vision will be greatly promoted under all winter conditions.

From the above description it is thought that the construction and operation of the invention will be fully understood without further explanation.

What is claimed is:

A windshield comprising the combination with a conventional windshield pane, gasket and molding, of a frame for mounting an auxiliary windshield pane, said frame being of substantially Z-shaped cross section having an outwardly extending flange confined against said gasket by said molding, said frame having a web extending perpendicular to the flange for spacing said auxiliary pane from the windshield pane, an inwardly extending flange on said frame at the end of said web, a clamp frame of substantially Z-shaped cross section having an outwardly extending flange overlapping the inwardly extending flange of the first named frame, securing screws passed through the outwardly extending flange of the clamp frame and the inwardly extending flange of the first named frame, the clamp frame having a web extending in a plane parallel with the web of the first named frame, the clamp frame having an inwardly extending flange disposed at the end of said web, an auxiliary glass pane confined within the space between the inwardly extending flange of both the first named frame and the clamp frame, and a gasket disposed on the edge portion of the auxiliary pane between the first named frame and the clamp frame to prevent rattling of the auxiliary pane.

GEORGE W. BABCOKE.